United States Patent Office 2,968,665
Patented Jan. 17, 1961

2,968,665

POLYFLUOROALKYLBIPHOSPHINE-BIS-(NICKEL TRICARBONYL) COMPOUNDS

Walter Mahler, Wilmington, Del., assignor to E. I. du Pont de Nemours and Company, Wilmington, Del., a corporation of Delaware No Drawing. Filed Mar. 12, 1959, Ser. No. 798,858

17 Claims. (Cl. 260—439)

This invention relates to a new class of chemical compounds. More particularly, it relates to polyfluoroalkylbiphosphine-bis-(nickel tricarbonyl) compounds and to a method for the preparation.

A need exists for catalytic compounds compatible with fluorocarbon systems to permit the synthesis of useful fluorocarbon chemicals, for example, fluorocarbon polymers, resistant to oxidation and thermally stable. Such polymers are employed for the preparation of films and articles, particularly useful in the presence of corrosive materials.

Phosphine-substituted nickel carbonyls, such as the triphenylphosphine derivatives, are known and have found utility as catalysts in the synthesis of organic compounds, e.g., as catalysts in acetylene reactions. However, their application to polyfluoro systems is limited due to their relative insolubilities and/or low thermal stabilities.

Accordingly, an object of the present invention is to provide thermally stable catalytic compositions, compatible with fluorocarbon systems. A further object is to provide a method for preparing such compositions. Additional objects will become apparent as this invention is more fully described.

I have found that the foregoing objects are attained when I provide compounds having the following structural formula:

$$(CO)_3Ni-\underset{\underset{R_1}{|}}{\overset{\overset{R}{|}}{P}}-\underset{\underset{R_2}{|}}{\overset{\overset{R}{|}}{P}}-Ni(CO)_3$$

wherein the R groups, which may be the same or different, represent monovalent polyfluoroalkyl radicals selected from the class consisting of $C_nF_{2n+1}$, $C_nF_{2n}Cl$, and $C_nF_{2n}H$, wherein n is an integer from one to five; and wherein each $R_1$ and $R_2$, which may be the same or different, is a member selected from the group consisting of R, hydrogen and halogen. The compounds are designated herein as polyfluoroalkylbiphosphine-bis-(nickel tricarbonyl) compounds, or, in abbreviated form, NiPPNi compounds. Compounds typical of the invention are:

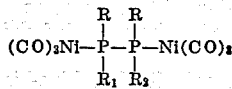

P-perfluoroethyl-P'-perfluoropropylbiphosphine-bis(nickel tricarbonyl)

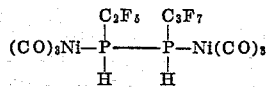

P-bisperfluoromethyl-P'-bisperfluoroethylbiphosphine-bis(nickel tricarbonyl)

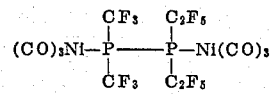

P-perfluoroethylchloro-P'-perfluoromethylbiphosphine-bis(nickel tricarbonyl)

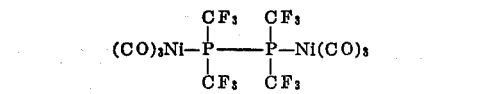

Tetrakisperfluoromethylbiphosphine-bis(nickel tricarbonyl)

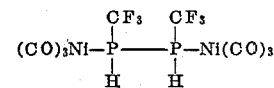

Sym-bisperfluoromethylbiphosphine-bis(nickel tricarbonyl, etc.

The NiPPNi compounds are obtained by reacting nickel tetracarbonyl with a polyfluoroalkylbiphosphine. No catalyst is required, and the reaction takes place readily in the absence of solvent. The process has as its essential feature bringing the two reactants in contact. Carbon monoxide is liberated, and when the reaction is complete, the NiPPNi compounds are obtained in nearly quantitative yields.

The biphosphines useful in the process may be prepared by any of several techniques known. For example, biphosphines are obtained when a disubstituted iodophosphine is reacted with mercury (J.C.S. 1953, 1565), when a secondary phosphine is reacted with a disubstituted chlorophosphine (Chem. Ber. 91, 2871 (1958)) and by the hydrolysis of a cyclopolyphosphine (J. Am. Chem. Soc. 80, 6161 (1958)).

The polyfluoroalkylbiphosphine operable in the process are described by the structural formula

wherein each R group is a member selected from the class consisting of $C_nF_{2n+1}$, $C_nF_{2n}Cl$, and $C_nF_{2n}H$, wherein n is an integer which may vary from one through five; and wherein each $R_1$ and $R_2$ is a member selected from the group consisting of R, halogen and hydrogen. Illustrative compounds are:

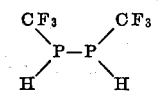

Sym-bisperfluoromethylbiphosphine

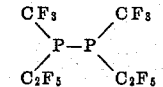

P,P'-perfluoromethylperfluoroethylbiphosphine

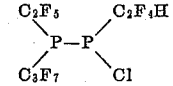

P-perfluoroethylperfluoropropyl-P'-tetrafluoroethylchlorobiphosphine etc.

The following examples, in which the parts are given by weight, are submitted to illustrate further and not to limit this invention.

Example 1

Tetrakisperfluoromethylbiphosphine (3.38 parts) was combined with 4.48 parts of nickel tetracarbonyl in a glass reaction tube at liquid nitrogen temperature. The reaction tube was closed and the reaction mixture was allowed to warm to room temperature at autogeneous pressure. After six days, 0.48 parts of carbon monoxide had formed. The unreacted nickel carbonyl and biphosphine were removed, and a deep violet, crystalline product remained. By analysis, its composition was determined to correspond to the formula

The crystals of tetrakisperfluoromethylbiphosphine-bis- (nickel tricarbonyl) melted in a sealed tube at 105° C. without decomposition. The conversion, based upon the biphosphine, was 86.5%.

*Example II*

In the manner described in Example I, 10.1 parts of tetrakisperfluoromethylbiphosphine were combined with 10.2 parts of nickel tetracarbonyl. The mixture was allowed to warm to room temperature and then was heated to 65° C. for about six hours. Periodically, the carbon monoxide formed was removed from the reaction vessel. Deep violet crystals, melting at 105° C. in a sealed tube, were obtained. The compound was identified as tetrakisperfluoromethylbiphosphine-bis(nickel tricarbonyl). The yield was quantitative.

*Example III*

Tetrakisperfluoromethylbiphosphine (3.38 parts) and 3.41 parts of nickel tetracarbonyl were dissolved in about 4.33 parts of toluene. The solution was then heated to 80° C. for one hour in the absence of foreign gases. A deep purple solution was obtained. Upon distillation of the toluene, crystals of tetrakisperfluoromethylbiphosphine-bis(nickel tricarbonyl) were obtained in 95% conversion.

*Example IV*

Following the procedure described in Example III except that a solution containing 6.82 parts of nickel tetracarbonyl and 17.3 parts of sym-di(octafluoro-n-butane)-biphosphine in 20 parts of perfluoro-(dimethylcyclohexane) is substituted for the toluene solution of nickel carbonyl and tetrakisperfluoromethylbiphosphine, the product obtained is sym-di(octafluoro-n-butane)biphosphine-bis(nickel tricarbonyl) whose composition corresponds to the formula

$$(CO)_3NiPH(C_4F_8H)PH(C_4F_8H)—Ni(CO)_3$$

*Example V*

Following the procedure described in Example III except that a solution containing 5.12 parts of nickel tetracarbonyl and 4.04 parts of sym-dichlorobis(tetrafluorochloroethyl)biphosphine in 20 parts of perfluoro(dimethylcyclohexane) is used, a product is obtained which, upon distillation of the excess nickel tetracarbonyl and the solvent, corresponds to the formula

$$(CO)_3Ni—PCl(C_2F_4Cl)—PCl(C_2F_4Cl)—Ni(CO)_3$$

The compound is sym-dichlorobis(tetrafluorochloroethyl)-biphosphine-bis(nickel tricarbonyl).

*Example VI*

The procedure of Example III is followed except that the toluene solution containing the reactants is heated to 60° C. for three hours under nitrogen in a flask, fitted with a reflux condenser. Tetrakisperfluoromethylbiphosphine-bis(nickel tricarbonyl) is obtained.

The preceding examples demonstrate that NiPPNi compounds are formed readily when nickel tetracarbonyl is reacted with polyfluoroalkylbiphosphines. The process consists essentially of combining the reactants, for example, in a chemically inert atmosphere, in an evacuated system or in solution, and heating to a convenient operating temperature.

The process can be effected over a wide range of temperatures, as is illustrated in the examples. Elevated temperatures are preferred because of the greater rate of reaction; temperatures between about 20 and 140° C. constitute the preferred range and hence, the range most commonly used. Temperatures above which the product decomposes should be avoided. The reaction is not pressure sensitive, i.e., it is not necessary that any of the reactants be in the liquid phase. If a batch process is used, the reaction system may be closed to prevent loss of any of the reactants. Alternatively, a vaporized reactant may be returned to the reaction zone for example, by refluxing or by recycle. Because the reactants are oxidized in the presence of free oxygen, e.g., air, free oxygen should be absent from the reaction zone. The foregoing can be most readily accomplished by removing the oxygen from the system or replacing the air with an unreactive gas.

Solvents in which the process of this invention is operable consist of fluorocarbons such as perfluoro(dimethylcyclohexane), perfluorooctane, etc.; alkanes, such as hexane; aromatic hydrocarbons, such as benzene and toluene; ethers as dibutyl ether; and other inert solvents in which the reactants are soluble.

It is preferred that the process of this invention be carried out with essentially stoichiometric quantities of reactants inasmuch as essentially quantitative yields of the desired product are produced. However, the ratio of the reactants is not critical from an operational standpoint. Unreacted substances are easily removed, for example, by distillation. Solvents may be evaporated from the products.

The products are dark-colored substances which do not dissolve or react with degassed water but dissolve readily in organic solvents, such as cyclohexane, benzene, ether, methanol and carbon tetrachloride, and in perfluorocarbons. The compounds are fairly stable toward heat and may be handled for short periods of time in air.

The novel NiPPNi compounds are useful as catalysts for the polymerization of acetylenic perfluoro compounds. For example, the tetrakisperfluoromethylbiphosphine-bis(nickel tricarbonyl), when present in a one to ten weight ratio with hexafluoro-2-butyne, initiates the polymerization of the butyne to a polymeric perfluoroolefin, in one case in a closed tube at a temperature of 85° C. for a period of 12 hours. Under identical conditions with hexafluoro-2-butyne alone, no polymerization occurs. The polymeric product is chemically inert, resistant to oxidation, thermally stable, and capable of being converted to films. A further use of the NiPPNi compounds is as antioxidants in hydrocarbon-based fuels.

As many apparently widely different embodiments of this invention may be made without departing from the spirit and scope thereof, it is to be understood that this invention is not limited to the specific embodiments thereof except as defined in the appended claims.

I claim:

1. A polyfluoroalkylbiphosphine-bis(nickel tricarbonyl) compound corresponding to the formula

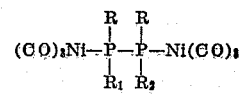

$$(CO)_3Ni—\underset{R_1}{\overset{R}{P}}—\underset{R_2}{\overset{R}{P}}—Ni(CO)_3$$

wherein each R group is a member independently selected from the class of monovalent radicals consisting of $C_nF_{2n+1}$, $C_nF_{2n}H$, and $C_nF_{2n}Cl$, wherein $n$ is an integer from one through five; and wherein each $R_1$ and $R_2$ is a member independently selected from the group of monovalent radicals consisting of R, hydrogen and halogen.

2. A compound as stated in claim 1 wherein each R is monovalent radical whose formula corresponds to $C_nF_{2n+1}$, where $n$ is an integer from one through five.

3. A compound as stated in claim 1 wherein each R is a monovalent radical whose formula corresponds to $C_nF_{2n}H$, where $n$ is an integer from one through five.

4. A compound as stated in claim 1 wherein each R is a monovalent radical whose formula corresponds to $C_nF_{2n+1}$, where $n$ is an integer from one through five.

5. A compound as stated in claim 1 wherein $R_1$ is hydrogen.

6. A compound as stated in claim 1 wherein $R_1$ is chlorine.

7. A compound as stated in claim 1 wherein each $R_1$ and $R_2$ is hydrogen.

8. A compound as stated in claim 1 wherein each $R_1$ and $R_2$ is chlorine.

9. Tetrakistrifluoromethylbiphosphine-bis-(nickel tricarbonyl) whose formula is $$(CO)_3NiP(CF_3)_2—P(CF_3)_2—Ni(CO)_3$$

10. Sym - di(octafluoro - n - butane)biphosphine-bis(nickel tricarbonyl) whose formula is $$(CO)_3NiPH(C_4F_8H)—PH(C_4F_8H)—Ni(CO)_3$$

11. Sym - dichlorobis(tetrafluorochloroethyl) - biphosphine-bis(nickel tricarbonyl) whose formula is $$(CO)_3NiPCl(C_2F_4Cl)—PCl(C_2F_4Cl)—Ni(CO)_3$$

12. A method for the preparation of a polyfluoroalkylbiphosphine-bis(nickel tricarbonyl) compound which comprises contacting nickel tetracarbonyl with a biphosphine having at least one polyfluoroalkyl substituent and having the remaining positions occupied by radicals selected from the group consisting of hydrogen and halogen, 13. A method as stated in claim 12, said reaction being effected at a temperature between about 20 and 140° C.

14. A method as stated in claim 12, wherein the polyfluoroalkylbiphosphine corresponds to the general formula

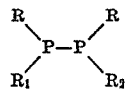

wherein each R is a member independently selected from the group of monovalent radicals consisting of $C_nF_{2n+1}$, $C_nF_{2n}H$, and $C_nF_{2n}Cl$, where $n$ is an integer from one through five; and wherein each $R_1$ and $R_2$ is a member independently selected from the group consisting of R, hydrogen and halogen.

15. The method as in claim 12 wherein the polyfluoroalkylbiphosphine is tetrakistrifluoromethylbiphosphine.

16. The method as in claim 12 wherein the polyfluoroalkylbiphosphine is sym-di(octafluoro-n-butane)biphosphine.

17. The process as in claim 12 wherein the polyfluoroalkylbiphosphine is sym-dichlorobis(tetrafluorochloroethyl)biphosphine.

No references cited.

UNITED STATES PATENT OFFICE
CERTIFICATION OF CORRECTION

Patent No. 2,968,665                          January 17, 1961

Walter Mahler

It is hereby certified that error appears in the above numbered patent requiring correction and that the said Letters Patent should read as corrected below.

Column 4, line 69, for "$C_nF_{2n+1}$" read -- $C_nF_{2n}Cl$ --.

Signed and sealed this 8th day of August 1961.

(SEAL)
Attest:

ERNEST W. SWIDER                        DAVID L. LADD
Attesting Officer                        Commissioner of Patents